Figure 4:
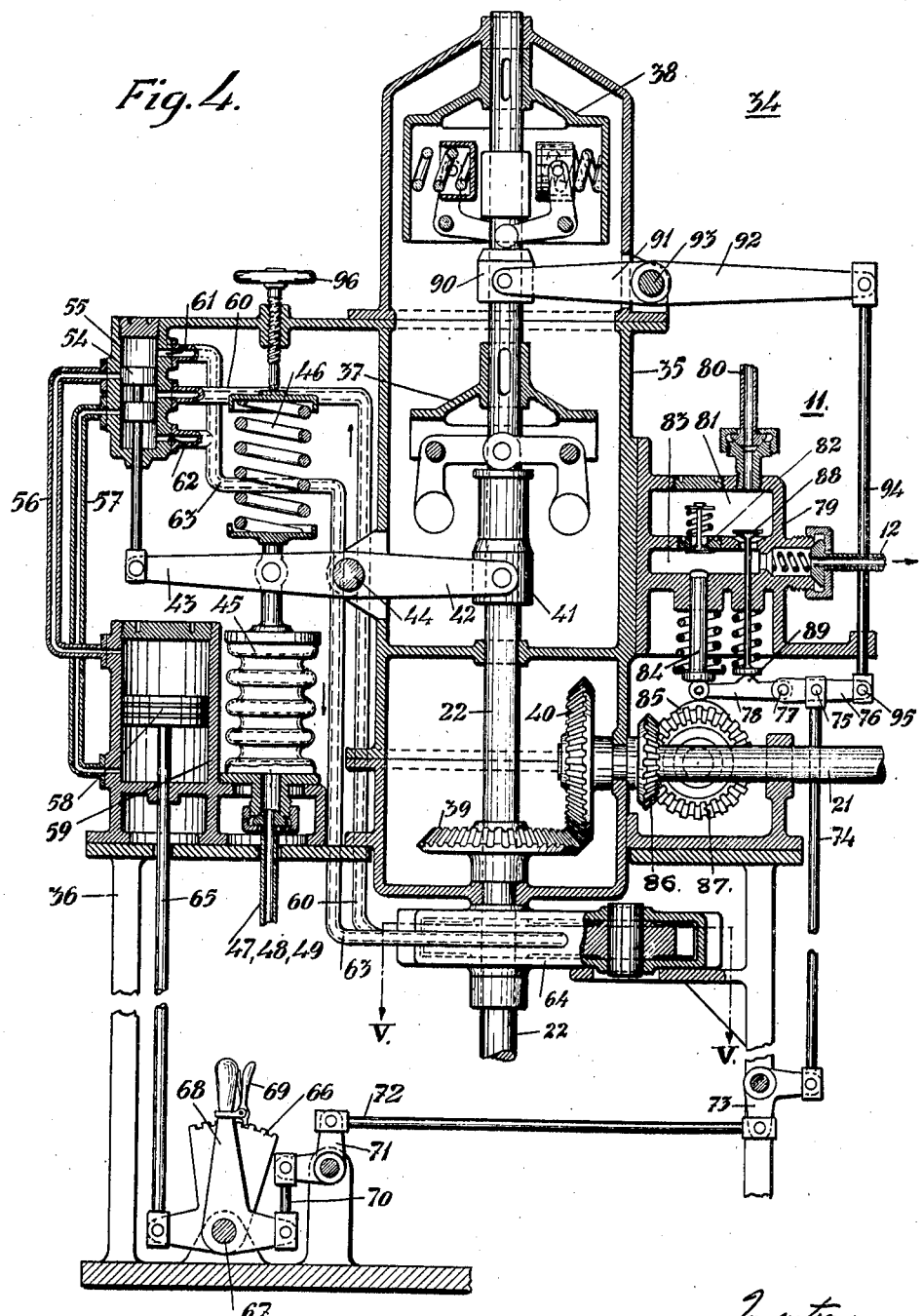

May 21, 1940.    J. E. JOHANSSON    2,201,682
PLANT COMPRISING TWO OR MORE PRESSURE MEDIUM GENERATORS
Original Filed June 19, 1937    7 Sheets-Sheet 1
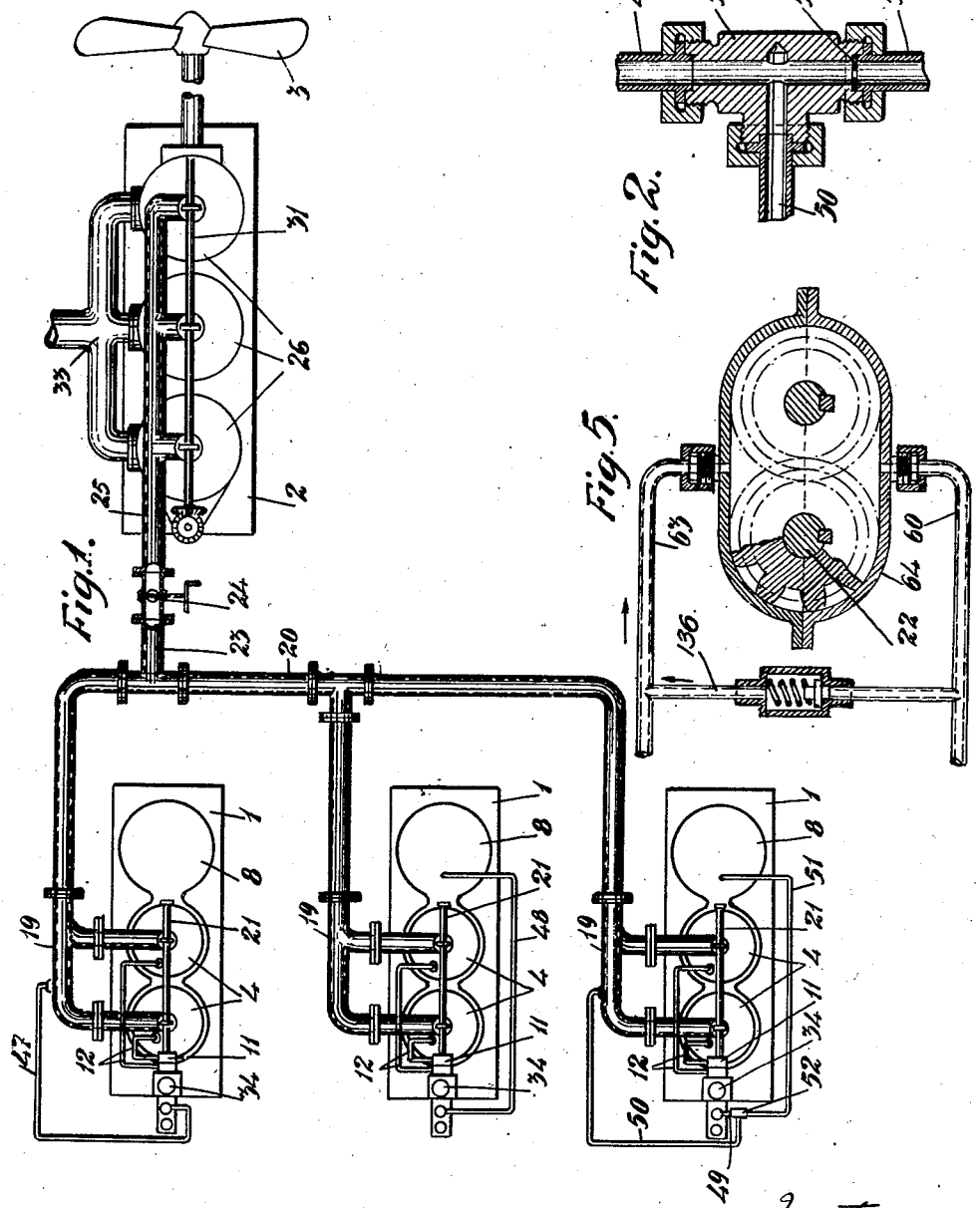

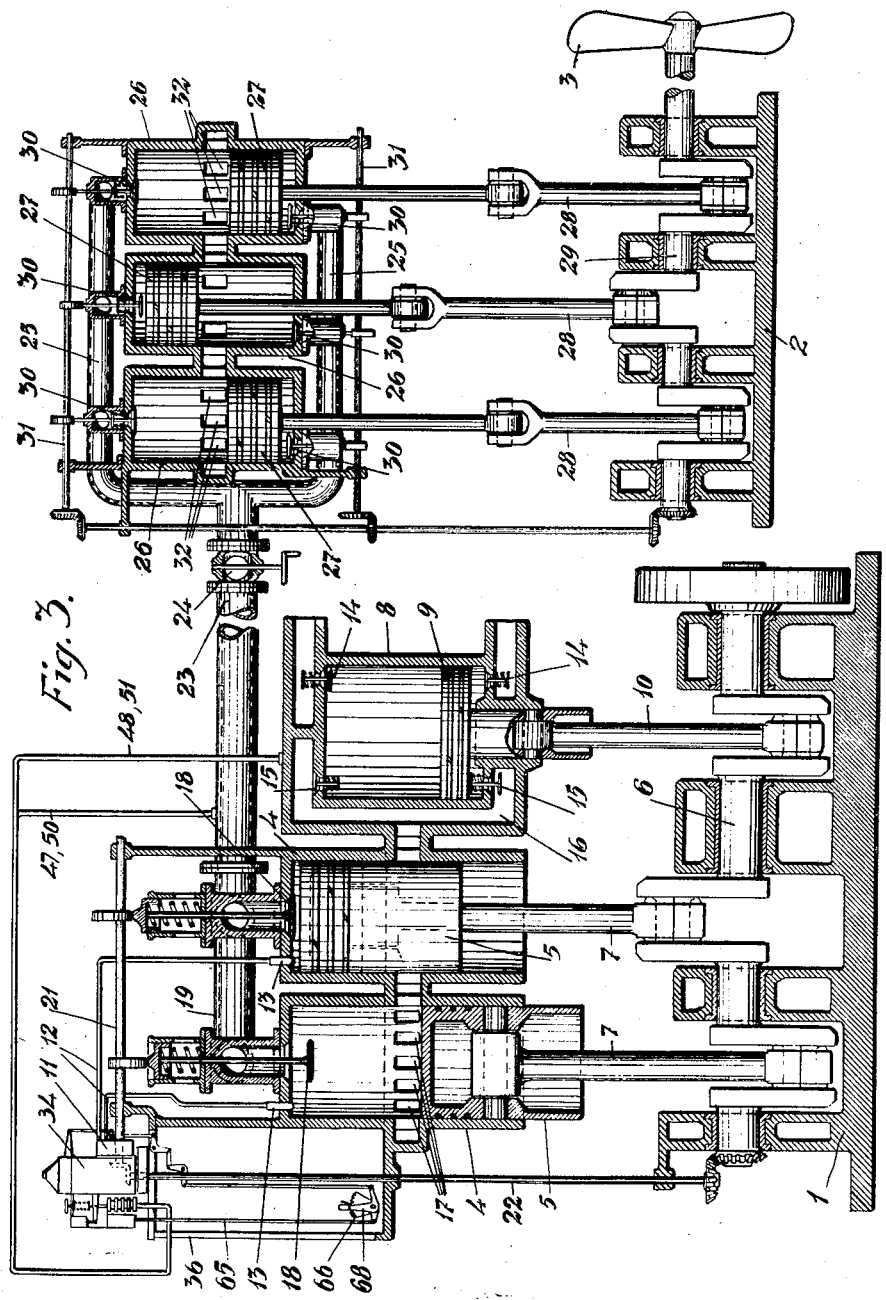

May 21, 1940. J. E. JOHANSSON 2,201,682
PLANT COMPRISING TWO OR MORE PRESSURE MEDIUM GENERATORS
Original Filed June 19, 1937 7 Sheets-Sheet 5
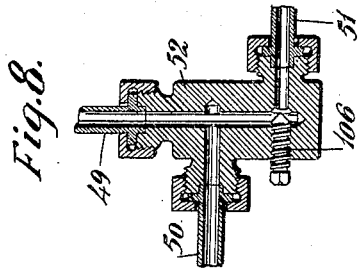
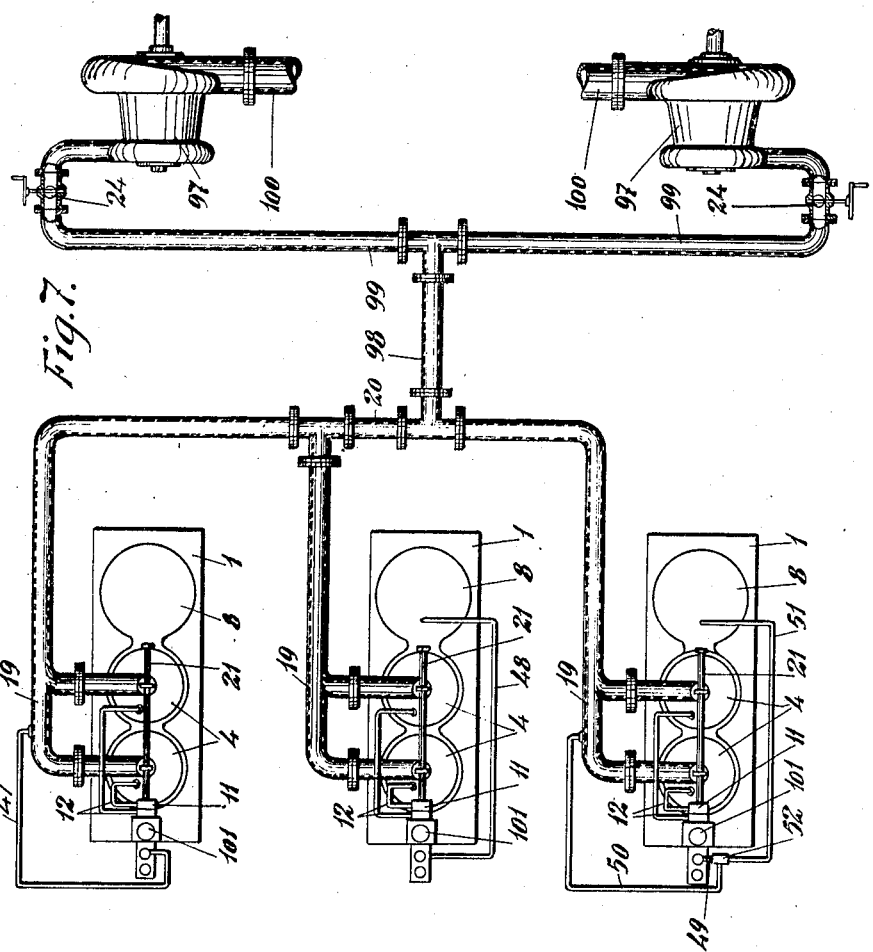

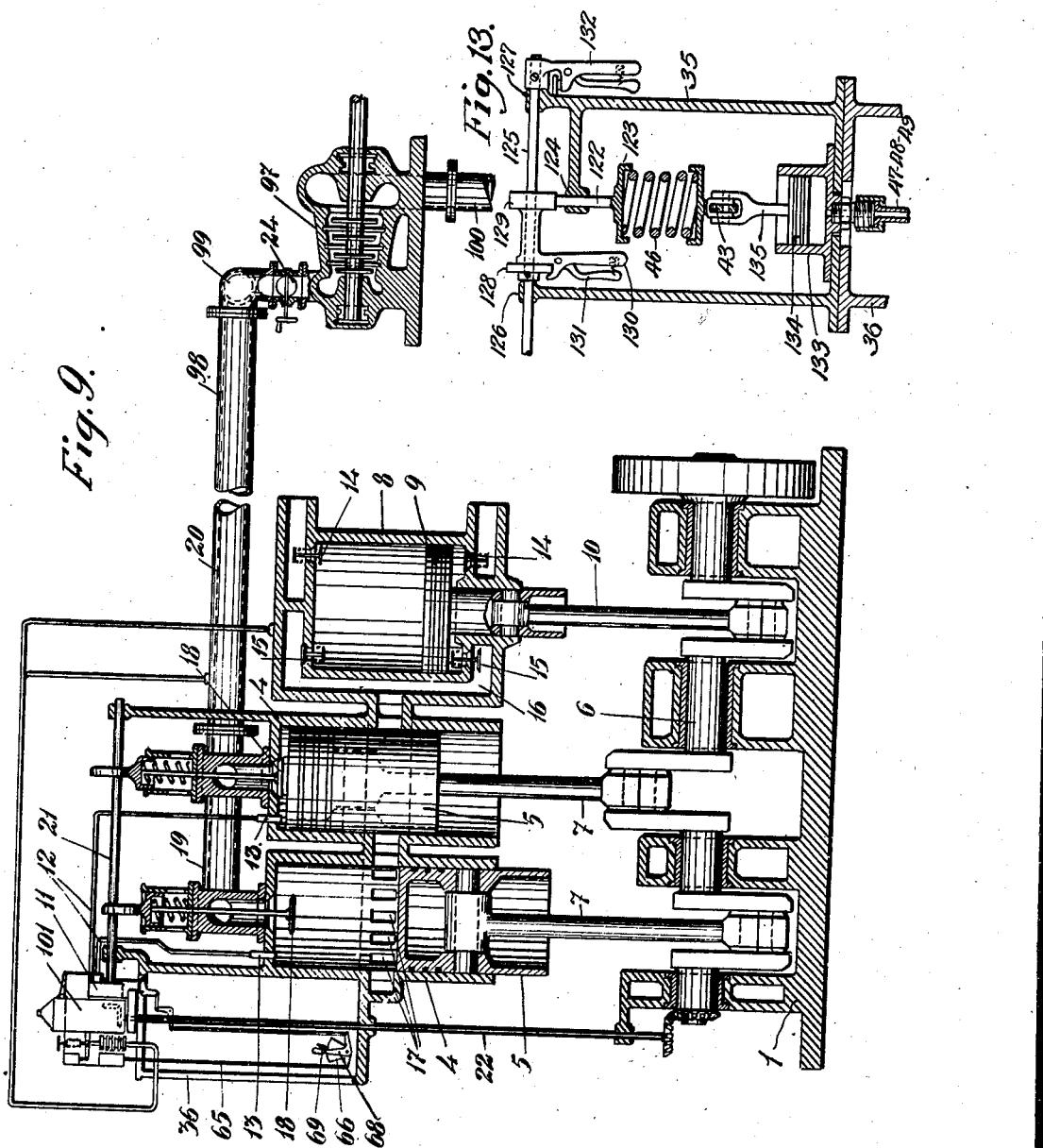

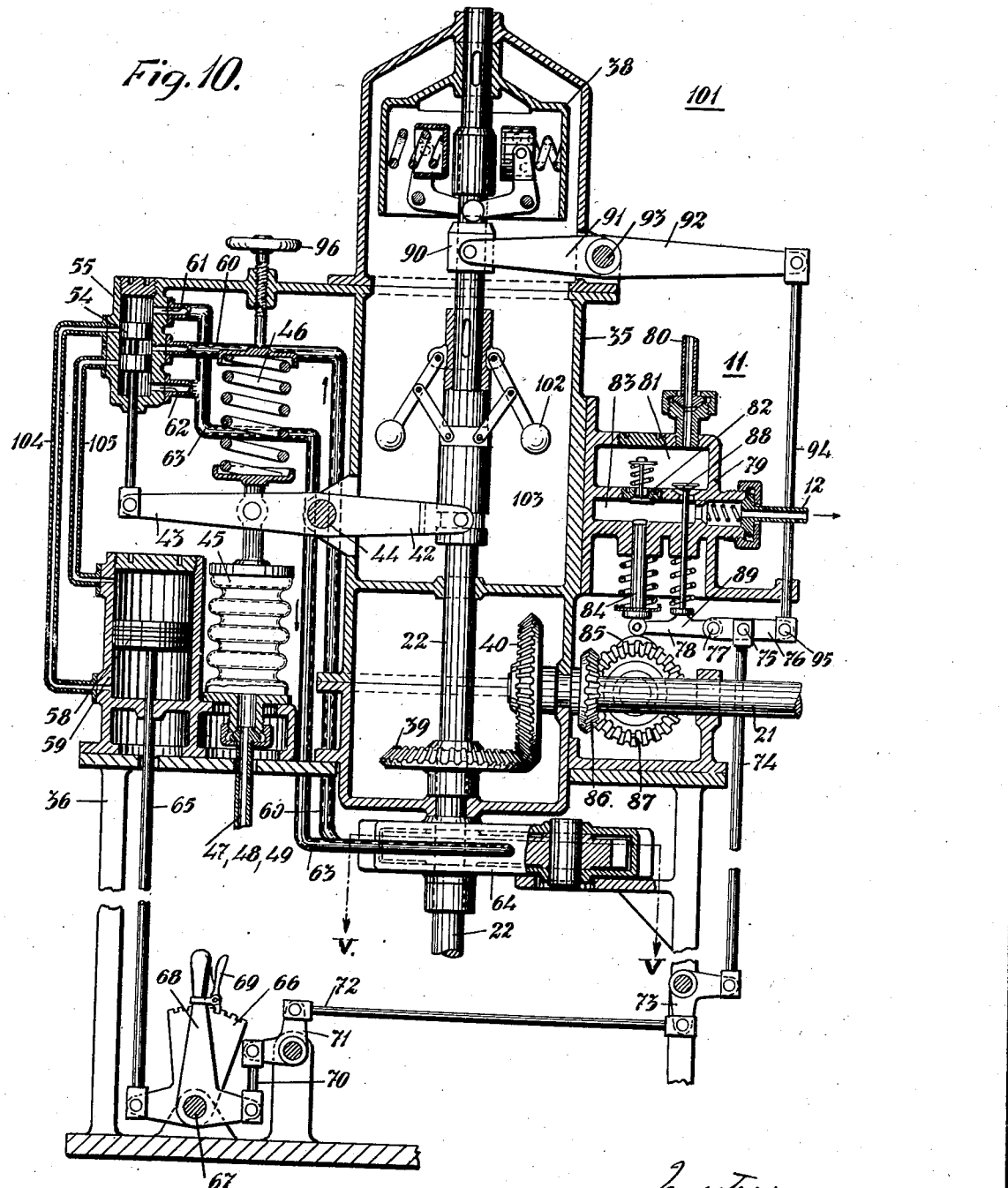

Patented May 21, 1940

2,201,682

UNITED STATES PATENT OFFICE 2,201,682

PLANT COMPRISING TWO OR MORE PRESSURE MEDIUM GENERATORS

Johan Erik Johansson, Goteborg, Sweden, assignor to Aktiebolaget Gotaverken, Goteborg, Sweden, a corporation of Sweden Original application June 19, 1937, Serial No. 149,085. Divided and this application January 21, 1938, Serial No. 186,090. In Sweden November 9, 1935

12 Claims. (Cl. 60—41)

This application is a division of my copending application, U. S. Serial No. 149,085, filed June 19, 1937.

This invention relates to plants comprising two or more pressure medium generators, which comprise pumps driven by internal combustion engines, and in which the delivery portions of different generators communicate with each other and the pressure medium is used for driving one or more reciprocating or rotating motors or supplied to other pressure medium consumers. The generators in such plants may comprise internal combustion engines driving liquid or elastic fluid pumps and the pressure medium produced by said generators may be compressed air or other gas, a mixture of compressed air and superatmospheric combustion gases from the internal combustion engines, steam, pressure liquid or the like.

One object of the invention is to enable the pressure medium generators comprised in plants of the above indicated types to be driven in such a way that at least some generators are operated on outputs standing in a desired relation to each other, and, for this purpose I provide means adapted to control the fuel supply to the internal combustion engines comprised in said generators so arranged that each generator is operated on the desired output.

However, in plants of the above mentioned type, where two or more pressure medium generators are operated in parallel, such control can usually not be obtained merely by providing controlling means at each separate internal combustion engine and making such means responsive to the speed of said engine, and, furthermore, it is sometimes impossible simply to use the condition of the pressure medium, for instance the pressure, for said purpose, since a distribution of energy between the internal combustion engines other than the desired distribution cannot be prevented thereby so that some generators are overloaded, whereas other generators are operated on too low load. Therefore, if, for instance, each internal combustion engine is to be driven on the same output, it may very well occur that the engines, in spite of being in the first mentioned case operated at the same speed, are supplied with different fuel quantities, and that the engines, in spite of being in the last mentioned case supplied with the same fuel quantities, are nevertheless operated at different speeds, and that consequently the engines in both cases are operated on other outputs than the desired.

The present invention, which takes full consideration to the above-mentioned conditions, substantially consists in the provision in a plant of a type indicated hereinabove of a governor at each pressure medium generator or at least at two of them, which governor is under the influence of the speed of the respective internal combustion engine comprised in the respective generator as well as of a condition, such as the pressure, of the pressure medium, and preferably also under the influence of a constant or substantially constant resistance, and which governor is adapted to control the output of the different internal combustion engines by varying the fuel supply thereto.

The invention may be used with advantage for controlling a number of pressure medium generators in plants comprising a number of internal combustion engines, the output of which is substantially utilized for the compression of air in a pump device driven by the respective internal combustion engine and utilized for the production of a medium comprising said air and the super-atmospheric combustion gases of the internal combustion engine, which medium for the purpose of driving a number of other engines, for instance a single engine, may be conducted through the delivery conduits of the internal combustion engines connected to each other or may be produced by admixing compressed air to the combustion and/or scavenging gases of said engines, when said gases have left the engines.

Figure 6:
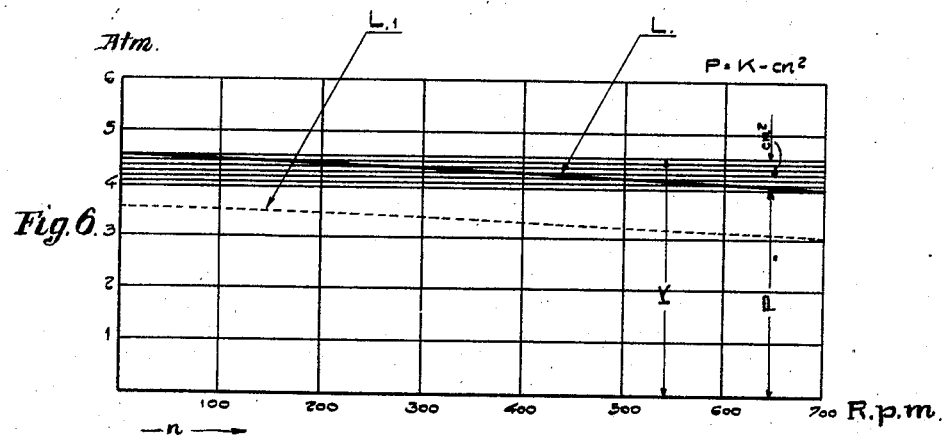

Other features of novelty will be hereinafter disclosed in connection with the description of some embodiments of the invention illustrated in the accompanying drawings, in which:

Fig. 1 is a plan view of a power plant of a vessel comprising three driving gas generators and a pneumatic motor, Fig. 2 is an enlarged sectional view of a detail of Fig. 1, Fig. 3 a longitudinal section of parts of the plant illustrated in Fig. 1, Fig. 4 is an enlarged section through the governor for one of the internal combustion engines illustrated in Figs. 1 and 3, Fig. 5 a section on line V—V in Fig. 4, and Fig. 6 a diagram illustrating the variations of the forces acting upon the governor illustrated in Fig. 4 at different speeds of the respective internal combustion engines.

Figure 11:
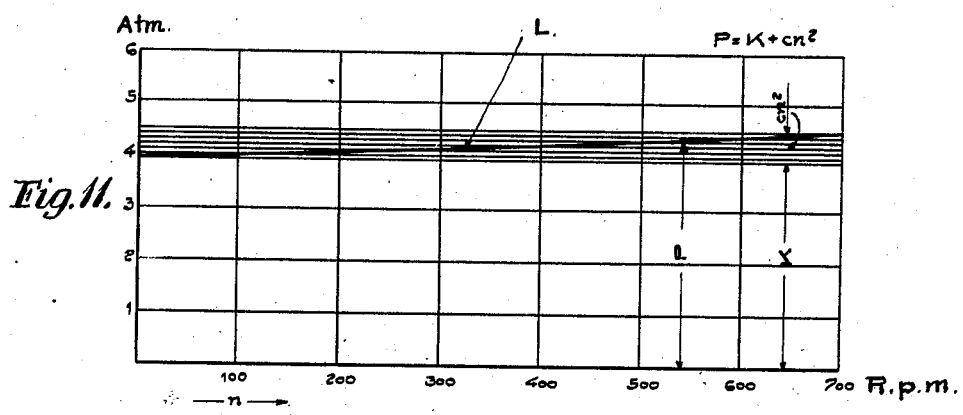
Figure 12:
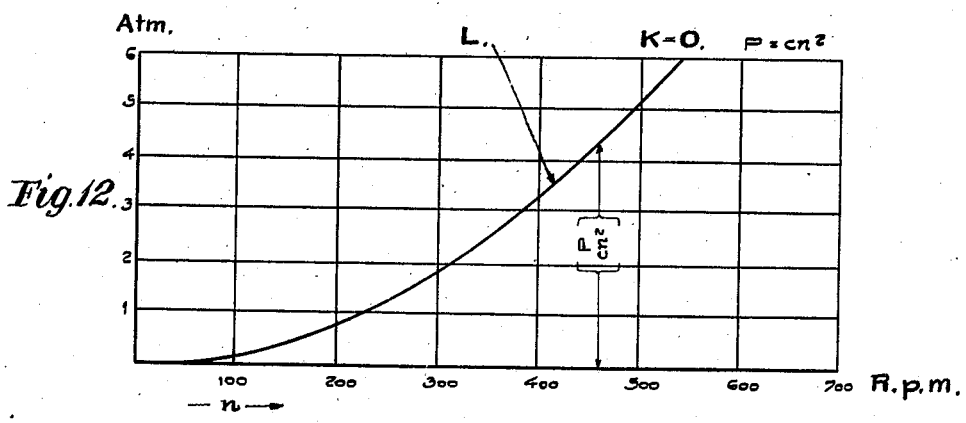

Fig. 7 is a plan view illustrating a power plant comprising three driving gas generators and two turbines driven by the pressure medium produced by said generators, Fig. 8 is a detail of Fig. 7, Fig. 9 a longitudinal section through one of the generators and one of the turbines illustrated in Fig. 7, Fig. 10 a vertical section through a governor for the internal combustion engines comprised in the generators illustrated in Figs. 7 and 9, and Fig. 11 a diagram illustrating the variations of the forces acting upon the governor illustrated in Fig. 10 at different speeds of the respective internal combustion engine, and Fig. 12 a diagram illustrating the variations of the forces acting upon the governor according to Fig. 10, if the spring 46 is omitted.

Fig. 13 is a partial section of a modified governor similar to those illustrated in Figs. 4 and 10.

Fig. 1 of the drawings illustrates diagrammatically a plan view of a plant according to the invention, in which 1 designates three pressure medium generators adapted to produce a driving gas mixture comprising partially expanded combustion gases and compressed air and utilized for driving a three-cylinder reciprocating motor 2. This motor is in the illustrated plant adapted for driving the propelling screw 3 of a vessel. As illustrated in Figs. 1 and 3 each pressure medium generator 1 comprises two internal combustion cylinders 4 provided with pistons 5 connected to a crank shaft 6 by means of connecting rods 7, and a compressor cylinder 8 provided with a piston 9 connected to the same crank shaft 6 by means of a connecting rod 10. Fuel is supplied to the combustion cylinders 4 by a fuel injection pump 11 through pipes 12 and fuel injection valves 13. Air is admitted to the compressor cylinder 8 through inlet openings in said cylinder controlled by spring loaded inlet valves 14 and the compressed air is delivered from the compressor cylinder through outlet openings controlled by spring loaded valves 15 to a chamber 16 communicating with the air inlet ports 17 of the combustion cylinders 4. The compressed air produced by the compressor is used for charging and scavenging the internal combustion cylinders and for admixing to the superatmospheric combustion gases to form the driving gas mixture. The super-atmospheric combustion gases from each combustion cylinder as well as the excess air passing said cylinders, which is compressed to about the same pressure, are conducted through outlet openings of the respective combustion cylinders controlled by valves 18 through exhaust conduits 19 to a conduit 20 common for the three driving gas generators. The valves 18 are controlled by cams provided on a cam shaft 21 driven from the crank shaft 6 over an intermediate spindle 22. The driving gas mixture is conducted through a conduit 23, which in order to enable the motor 2 to be operated is provided with a shut-off valve 24, to the inlet manifolds 25 of the pneumatic motor 2.

This motor, which in the illustrated embodiment is a double-acting reciprocating motor comprises three cylinders 26 with pistons 27 and connecting rods 28 connected to a crank shaft 29, is in the present case adapted for driving the propelling screw 3 of a vessel. The driving gas mixture is admitted to the pneumatic cylinders 26 through openings controlled by valves 30 operated by cams on cam shafts 31 driven from the crank shaft 29 through an intermediate vertical spindle. After having transmitted energy to the pistons 27 the driving gas escapes through the outlet ports 22 to the exhaust 33 leading to the atmosphere.

Each internal combustion engine comprised in the plant illustrated in Figs. 1 and 3 has a governor 34, which is illustrated on a larger scale in Figs. 4 and 5. The governors 34 consist of a governor housing 35 mounted on a support 36 on the internal combustion engine. The intermediate shaft 22 projects into the governor housing and is mounted in bearings in said housing and carries two centrifugal governors 37 and 38. A gear wheel 39 secured on the governor shaft 22 serves to drive a gear wheel 40 secured on one end of the cam shaft 21, which is also mounted in bearings in the governor housing. The deviations of the sleeve 41 of the centrifugal governor 37, which sleeve is preferably slidable on the shaft 22, are transmitted to the open end of an arm 42 of a double-armed lever 42, 43 pivotally mounted on a pivot 44 and to membrane bellows 45 or the like connected to the arm 43 of said double-armed lever 42, 43 and influenced against the action of a spring 46 or other pressure means by the pressure of the driving gas mixture in the conduit 20, which is admitted to the membrane bellows 45 through a pipe 47, as indicated in the upper generator illustrated in Fig. 1, or by the substantially equal pressure of the compressed air, which may be admitted through a pipe 48, as indicated in the central driving gas generator illustrated in Fig. 1. The membrane bellows 45 or the like may also be influenced simultaneously by the pressure in the conduit 20 and the pressure of the compressed air admitted through pipes 49, 50 and 51, as indicated in the lower driving gas generator illustrated in Fig. 1. In this case the pipes 49, 50 and 51 may be connected to a pipe joint 52 and a throttle opening 53 may be provided in the connection between the pipe 51 from the compressor and the pipe joint 52, as shown in Fig. 2. Through this arrangement a slow stream of pure compressed air is caused to flow to the membrane bellows or the like and through the pipe 50 to the conduit 20, so that the driving gas mixture and the combustion gases comprised therein cannot enter the membrane bellows, which are consequently kept clean under all conditions. The arm 43 of the double-armed lever 42, 43 is also connected to a control valve 54 slidable in a housing 55 and adapted to control the openings of two pipes 56 and 57 into the housing 55. Said pipes communicate with the upper and lower side of a piston 58 movable in a cylinder 59 and the control valve 54 alternatively connects the different sides of the piston 58 to a pressure medium such as pressure oil supplied to the housing 55 through a pipe 60 and serving to displace the piston 58 in one direction or the other according to the position of the control valve. For this purpose the valve 54 is constructed in such a way that the side of the piston 58, which is momentarily not acted upon by the pressure medium is connected through one of the pipes 56 or 57, respectively, to the housing 55 and through openings 61 and 62 in the walls of said housing, for instance, to a return pipe 63 leading to the suction side of a pump 64, which produces the pressure medium, and which may, for instance, comprise two gear wheels, one of which may be mounted on the shaft 22, as illustrated in Figs. 4 and 5. When the valve 54 is in its medium position and consequently shuts off the openings to the pipes 56 and 57, the pressure medium produced by the pump may be conducted from the pressure side of the pump directly to the suction side through a by-pass 138 containing a springloaded valve, as illustrated in Fig. 5.

The piston rod 65 transmits the displacements of the piston 58 to a segment 66 swingable on a pivot 67 and connected to an operating arm 68, which may be set along the curved and toothed surface of the segment 66 by means of a manually releasable ratchet mechanism 69.

A rod 70 or the like connects the operating arm 68 over an angle lever 71, a rod 72, an angle lever 73 and a rod 74 to a point 75 on a lever 76. The inner end of said lever is pivotally connected at 77 to a lever 78, which controls the operation of the fuel injection pump 11. This fuel pump is adapted to supply fuel to the cylinders of the internal combustion engines through the pipes 12 connected to the fuel injection valves 13. The fuel injection pump housing 79 is supplied with fuel through a pipe 80 and the fuel is admitted from a chamber 81 through an opening controlled by a valve 82 to the pressure chamber 83. A plunger 84 is pressed into the chamber 83 against the action of a spring by means of a cam 85 provided on a shaft driven from the cam shaft 21 over gears 86 and 87. The inner end of the lever 78 is inserted between the cam 85 and the head of the plunger 84. A springloaded valve 88 is provided in the wall between the pressure chamber 83 and the chamber 81. A cam 89 or the like on the lever 78 is adapted to press the valve stem of said valve in certain positions of the cam 85 and the lever pivot 77 and thereby to cause the valve 88 to open and the pressure in the chamber 83 and the fuel injection to cease. The opening of the valve 88 occurs during the pressure stroke of the pump plunger 84 and interrupts the high injection pressure produced by said plunger at an earlier or later stage of the plunger stroke, so that a smaller or larger fuel quantity is injected in the internal combustion cylinder, according to the momentary position taken by the lever 78. Thus the fuel supply is reduced or increased according to the forces just acting upon the double-armed lever 42, 43.

The centrifugal governor 38 has a sleeve 90 slidable upon the shaft 22 and acting upon one end 91 of a double-armed lever 91, 92 pivotally mounted in the governor housing at 93 and connected with the open end of the arm 92 through a rod 94 to the point 95 of the lever 76. When the governor 38 due to an increase or reduction of the speed of the internal combustion engine displaces the sleeve 90 upwards or downwards the point 95 of the lever 76 is lowered or raised and consequently the point 77 is raised or lowered and interruption of the high injection pressure during the stroke of the plunger 85 through opening of the valve 88 is caused at an earlier or later stage during said stroke so that the fuel quantity supplied to the internal combustion engine is reduced or increased.

In the embodiment illustrated in Fig. 4 the governor 34 is arranged in such a manner that the pressure acting upon the double-armed lever 42, 43 and originating from the spring 46 is counteracted by the pressure caused by the centrifugal governor 37 as well as the pressure prevailing in the common conduit 20 or in the air compressor, which is transmitted to the lever arm 43 by the membrane bellows 45 or the like through the pipes 47, 48 or 49, respectively. In order that these forces may be balanced at a certain spring pressure a distinct pressure in said membrane bellows or the like must always correspond to a certain speed of the respective internal combustion engine. Consequently, the double-armed lever 42, 43 of each governor, which is each per se acted upon by the pressure prevailing in the common conduit 20 or in the air compressor 8, which latter pressure is always slightly higher than the pressure in the common conduit 20, is only able to take its normal position of balance and each internal combustion engine to be driven with the desired partial output, if the pressure exerted by the centrifugal governor 37 on the lever 42, 43 and the speed corresponding thereto is of a certain value, determined for each internal combustion engine. In the embodiment above described this may be achieved by proper control of the fuel supply of each internal combustion engine. The tension of the spring 46, which may be used for adjustment of the output of the internal combustion engine, may be adjusted by means of a set screw 96, as illustrated in Fig. 4, or by means of other suitable devices.

The above statements of the operation of the governor 34 are further illustrated in the deagram shown in Fig. 6. The curve L in this diagram shows that, for instance, at $n=400$ revolutions per minute of the governor shaft 22 the super-atmospheric pressure P of the driving medium is 4.3 atm., whereas the pressure $cn^2$, caused by the governor 37 in the same direction and referred to the point of application of the pressure medium on the lever 43, is 0.3 atm., and that at $n=700$ revolutions per minute of the governor shaft 22 the super-atmospheric pressure of the medium has sunk to 4 atm., and that the pressure originating from the governor 37 has risen to 0.6 atm. The spring 46 is then adjusted in such a manner by means of the screw 96 or other adjusting means that both pressures are counteracted by the spring force K, which may be assumed as a constant force, in the present case equal to 4.6 atm. It is also indicated in the diagram in Fig. 6 by means of a dotted curve $L_1$ that it is possible by varying the spring tension to cause the different internal combustion engines to be controlled in the desired manner also at lower (and naturally also higher) driving medium pressures than the one above mentioned. Also in this case the general formula is $K=P+cn^2$. In the above mentioned member $cn^2$ the factor $c$ is a characteristic of the governor, which depends upon the design and dimensions of the governor, and $n$ is the speed of the governor shaft.

Obviously, if the internal combustion engine operates on the two-cycle principle, the motor shaft 6 and the cam shaft 21 in the illustrated embodiment run with the same speed, and, if the motor operates on the four-cycle principle, the motor shaft runs with twice the speed of the cam shaft. In any case, the governor shaft 22, which transmits the motion from the motor shaft to the cam shaft may be geared to said shafts so as to run with the same or other speed than said shafts, for instance, in order to reduce the dimensions of the centrifugal governor the shaft 22 may be geared to the motor shaft and the cam shaft so that the speed of the governor shaft is higher, for instance twice the speed of the motor shaft.

The embodiment of the invention above described works in the following manner:

If, by some reason, the different internal combustion engines comprised in the plant are operated on mutually different outputs, the lever arms 43 at the internal combustion engines, which are operated on too low output and consequently at a lower speed than the speed corresponding to the pressure in the common conduit 20 or the compressors, have to be swung down from the normal position of balance illustrated in Fig. 4, whereas the corresponding lever arms 43 at the internal combustion engines operating on too high output and at too high speeds have to be swung upwards from the normal position. In the first mentioned case, i. e., upon the occurrence of a low load on the respective internal combustion engines, the respective control valve 54 is consequently moved downwards in its housing 55 thus opening communications through the pipe 57 to the under side of the piston 58 for the pressure medium in the conduit 60 and from the upper side of the piston 58 through the pipe 56 and the opening 61 to the return pipe 63 and the suction side of the pump 64. The piston 58 is then displaced upwards and thereby lowers the point 75 of the lever 76 in the fuel injection pump 11 and, since at this moment the point 95 is not moved, the point 77 moves downwards. The resulting displacement of the lever 78 causes the valve 88 to open at a later stage during the pressure stroke of the plunger 84, and consequently an increased fuel quantity is supplied to the fuel injection valves 13 of the internal combustion engine through the pipes 12 resulting in an increase in the speed of the internal combustion engine, until it has reached the desired value. Then the increase of the fuel supply ceases and the lever arm 43 resumes its normal position of balance under the influence of the increased load on the same from the governor 37 due to the increase in the speed. The control valve 54 then shuts off the pipes 56 and 57 leading to the spaces above and below the piston 58 so that the cylinders of the respective internal combustion engine are supplied with the duly increased fuel quantity. However, the fuel quantity thus obtained is usually somewhat too large with regard to the pressure P in the conduit 20 or the compressors 8 causing the speed of the internal combustion engine and the load on the lever 42, 43 depending thereupon to be increased so much that the lever arm 43 is now swung upwards against the action of the spring 46. In the position then taken by the control valve 54 communications are opened between the upper side of the piston 58 and the pressure pipe 60 and between the under side of the piston 58 and the outlet opening 62 so that the piston is displaced downwards by the pressure prevailing in the pipe 60 and consequently the points 75 and 77 of the lever 76 at the fuel injection pump 11 are moved upwards by means of the parts 65, 66, 68, 70, 71, 72, 73 and 74. Since the point 95 may be regarded as fixed at this moment, the point 77 moves upwards so that the lever 78 causes the valve 88 to open at an earlier stage during the pressure stroke of the plunger 84 and consequently the fuel supply to the cylinders of the internal combustion engine to be reduced, and a corresponding reduction of the speed of said engine to take place. If the speed of the internal combustion engine should hereby be reduced too much and not correspond to the speed corresponding to the pressure in the pipe 47, 48 or 49, respectively, the lever arm 43 is in the manner above described swung downwards and the point 77 of the lever 78 moved downwards so that the fuel supply is again increased. In this manner the lever 78 may be caused to move its end 77 repeatedly in one direction or the other until said lever and the double-armed lever 42, 43 finally reach the medium position, in which the respective internal combustion engine is supplied with such a fuel quantity that at the pressure prevailing in the pipe 47, 48 or 49, respectively, it is operated at a speed corresponding to said pressure and determined by the tension of the spring 46. These oscillations in the pressure supply may naturally be eliminated, if a follow up device of any type, similar to those used in governors for turbines and other engines, is interposed in the present governor. Naturally, the internal combustion engines, which from the beginning were operating on high outputs and high speeds, are controlled in similar manner so that possibly after several oscillations of the levers 42, 43 the speeds of these internal combustion engines are also reduced to their proper values. Increase and reduction of the output of all internal combustion engines, for instance, when it is desired to overload the reciprocating pneumatic motor or to idle said motor, may be achieved in a simple manner without change of the adjustment of the controlling devices by displacing the point 75 of the lever 76 through displacement of the operating arm 68 in one direction or the other along the segment 66 and locking said arm 68 in adjusted position by means of the ratchet mechanism 69. Simultaneously, the point on the curve L in the diagram in Fig. 6, at which the internal combustion engine is normally to be operated, is displaced. The speeds of the internal combustion engine are kept within certain limits at constant or varying piessures in the pipe 47, 48 or 49 by the maximum speed governor 38, which upon the occurrence of a too high speed displaces the point 95 of the lever 76 by means of the lever 91, 92 and the rod 94 downwards causing the point 77 of the levers 76, 78 to move upwards and consequently to produce a reduction of the fuel supply to the internal combustion engine.

A plant illustrating a further embodiment of the invention and comprising pressure medium generators supplying pressure medium to a common conduit and turbines connected to said conduit is shown in Figs. 7, 8 and 9 and in Fig. 10 a governor, which may be used in such a plant is also illustrated. Figs. 11 and 12 are diagrams illustrating the operation of said governor with and without the spring 46. In Figs. 7–10 the same reference numerals are used to indicate parts, which have their equivalence in Figs. 1–5 and which have already been described in connection with said figures. Therefore, only the parts, which differ from those described in connection with Figs. 1–5, will be dealt with hereinbelow.

In the plant illustrated in Figs. 7 and 9 three driving gas generators 1 provide a pressure medium such as a driving gas mixture to a common conduit 20 and turbines 97 connected to said conduit through conduits 98 and 99 and controlled by means of valves 24 provided in the conduits 99 and provided with not illustrated relieve valves and other accessories, which may be considered desirable. The turbines may be connected to any kind of machinery such as electric generators, centrifugal pumps, fans, propelling machinery of vessels, rail-road engines or other mobile or stationary machinery. The pressure medium expanded in the turbine is conducted from the turbines through exhaust conduits 100, which may lead to the atmosphere or to suitable condensers. The pressure medium generators 1 in Figs. 7 and 9 are of the same construction as illustrated in Figs. 1 and 3 and described hereinabove, but the governors 101 of the internal combustion engines comprised in said generators are slightly different from the governor 34 illustrated in Fig. 4 and described in connection therewith.

It is obvious from the statements in connection with Figs. 1-4, in which a pneumatic motor 2 is adapted to be operated by means of the shut-off valve 24 that a high speed of the internal combustion engines correspond to a comparatively low pressure of the driving gas mixture and a low speed to a high pressure, and that consequently the curve L in the diagram in Fig. 6 is inclined in the manner illustrated in the drawings. However, the conditions are reversed, i. e., said curve is inclined upwards from the left, if one or more gas-driven engines are operated with the aid of means for manually controlling the fuel supply to the internal combustion engines, as the case may be, when the driving gas mixture is used in one or more turbines. The same conditions may prevail, when the supply of fuel to a number of internal combustion engines is to be controlled, which engines drive each a pump or compressor connected to the respective crank shaft, from which generators pressure liquid, compressed gas or steam is supplied to a common conduit for further utilization. In such a case a high pressure of the pressure medium does always correspond to a high speed of the internal combustion engines, and a low pressure to a low speed. Under such conditions, however, the governor 34 has to be changed, as illustrated in Fig. 10, so that the centrifugal governor 102 of the governor 101 acts upon the double-armed lever 42, 43 by means of the sleeve 103 in the opposite direction to the one described in connection with Fig. 4, so that the pressure exerted by the governor sleeve 103 and the spring 46 act upon the lever 42, 43 in one direction and the pressure originating from the pressure medium in the opposite direction. As will be seen from Fig. 10 the sleeve 103 of the governor 102 has a tendency to move upwards, when the speed of the governor shaft 22 increases, and to move downwards upon a reduction of said speed. The spring 46 and the governor 102 in this embodiment cooperate to balance the force originating from the pressure medium in the membrane bellows 45 and acting upon the double-armed lever 42, 43. Furthermore the control sleeve housing 55 is connected to the upper and lower side of the piston 58 by means of pipes 104 and 105 in such a manner that an upward movement of the control sleeve 54 causes an increased fuel injection and vice versa. The governor illustrated in Fig. 10 operates according to the formula $P=K+cn^2$, illustrated by the curve L in Fig. 11. In this formula K may assume the value 0, i. e., the control of the output of the separate internal combustion engines may here be achieved with substantially the same result without the use of the above-mentioned spring 46. In such a case i. e., if the spring 46 is omitted, the governor according to Fig. 10 operates according to the formula $P=cn^2$ illustrated by the curve L in Fig. 12.

In Fig. 8 and in the lower generator illustrated in Fig. 7 a device is illustrated, which prevents the comparatively warm and more or less impure driving gas mixture to enter the membrane bellows 45 or the like of the governor, but nevertheless to keep the membrane bellows under the influence of the pressure of the driving gas mixture. For this purpose the pipe 50 is connected to the pipe joint 52, which is connected to the membrane bellows or the like through the pipe 49 and to the pressure chamber of the compressor through the pipe 51, which opens into the joint through an opening throttled by means of a screw 106, which may be adjusted so that a small quantity of air is continuously supplied to the membrane bellows or the like, and so that a small quantity of air flows through the pipe 50 to the conduit 19.

It is obvious that the application of the invention illustrated in Figs. 1-12 is not limited to the number of generators producing pressure medium as above described, and the invention may be applied to plants, in which any number of pressure medium generators greater than one are driven in parallel. The pressure medium consumers may of course also be of any number and they may be reciprocating or rotating motors operated on liquid or gaseous fluids or any other pressure medium consumers. In such plants two or more of the generators comprised in the plant may be provided with the controlling means described in connection with the above-mentioned figures.

The details of the above described embodiments of the invention may furthermore be subjected to several modifications within the scope of the claims. The centrifugal governors 37 and 102 illustrated in Figs. 4 and 10 may, for instance, be replaced by any other device, through which at different speeds of the respective generator a varying pressure upon the controlling mechanism may be obtained. A necessary condition, however, is that the device is driven at a speed, which is a function of the speed of the respective generator. Such a device may be so designed that the curve L in Figs. 6, 11 or 12 takes other forms than those illustrated in the drawings. Naturally, the governor 37 or 102 may be adapted to act directly upon the fuel supply controlling mechanism of the respective internal combustion engine without the use of the piston 58 and the parts cooperating therewith. In the embodiment illustrated in Figs. 4 and 10 the lever 76, which controls the fuel supply, may be directly connected to the lever 43, for instance by means of a link or the like. Instead of being influenced by the pressure of the pressure medium produced by the generators the governor 34 or 101 or the like may be under the influence of other varying conditions of said medium, for instance its temperature. The substantially constant load acting upon the lever 43 and produced by the spring 46 may naturally be produced by means of a suitable weight. The screw 96 may be replaced by a lever arm or the like acting upon the spring 46 and adapted to be locked in different positions of adjustment. Such a device may in certain cases form a more simple and suitable adjustment means for the spring pressure. In Fig. 13 an embodiment of such a device is illustrated. Fig. 13 is a partial section through a governor of the type illustrated in Figs. 4 and 10 and shows adjustment means for the pressure of the spring 46 comprising a rod 122 connected to the upper spring cup 123 and slidable in a guide way 124. A shaft 125, which may be common for a number of governors, is mounted in bearings 126 and 127 formed by the governor housing 35 and a toothed segment 128 or the like is secured on said shaft. A cam 129 adapted to actuate the rod 122 and connected to a lever 130 is rotatable on the shaft 125 and may be locked in different positions of adjustment relatively to said shaft by means of a ratchet mechanism 131 cooperating with the toothed segment 128. Similar devices may be provided on the shaft 125 at the governors of other generators comprised in a plant. A main lever 132 may be secured on the shaft 125 at one of the governors and may be used for simultaneously adjusting the springs 46 of all governors. Separate adjustment of the springs 46 at the different governors may then be accomplished by means of the lever 130. Fig. 13 also shows a cylinder 133 communicating with the pipes 47, 48 or 49, respectively, and having a piston 134 slidably provided therein and adapted to transmit the pressure of the pressure medium or any similar pressure through the rod 135 to the lever 43, said device being equivalent to the membrane bellows 45 illustrated in the governors 34 and 101.

What I claim is:

1. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said driving gas generators, one or more motors adapted to be driven by said driving gas mixture, governors for said driving gas generators, and for each governor a device responsive to the speed of the pertaining generator and a device responsive to the pressure of the pressure medium, said devices being adapted to simultaneously actuate said governor, which is adapted to control the output of the pertaining pressure medium generator by varying the fuel supply to the internal combustion engine comprised therein.

2. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, governors for said driving gas generators, and for each governor a device responsive to the speed of the pertaining driving gas generator, a device responsive to a condition of the driving gas mixture and a substantially constant resistance, said devices and resistance being adapted to simultaneously actuate said governor, which is adapted to control the output of the pertaining driving gas generator by varying the fuel supply to the internal combustion engine comprised therein.

3. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, governors for said driving gas generators, for each governor a device responsive to the speed of the pertaining driving gas generator, a device responsive to the pressure of the driving gas mixture, and a spring, said devices and spring being adapted to simultaneously actuate said governor, which is adapted to control the output of the pertaining driving gas generator by varying the fuel supply to the internal combustion engine comprised therein.

4. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, governors for said driving gas generators, for each governor a device responsive to the speed of the pertaining driving gas generator, a device responsive to a condition of the driving gas mixture, and a spring, said devices and spring being adapted to simultaneously actuate said governor, which is adapted to control the output of the pertaining driving gas generator by varying the fuel supply to the internal combustion engine comprised therein, and a means such as a shaft common for two or more governors and adapted for simultaneously adjusting the tension of the springs at different governors by means such as cams provided on said shaft at the different governors.

5. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, governors for said driving gas generators, a fuel supply control device for each internal combustion engine, in each governor a movable member adapted to actuate said fuel supply control device of the pertaining internal combustion engine and to control the output of the driving gas generator by varying the fuel supply to said internal combustion engine, a device responsive to the speed of said internal combustion engine and adapted to move said member to reduce the fuel supply upon a rise in speed and vice versa upon a reduction in speed, a device responsive to a pressure prevailing in said driving gas generator adapted to move said member in a similar way as said speed responsive device upon a rise or a reduction, respectively, in said pressure, and a resistance acting on said member to counteract said speed responsive and pressure responsive devices.

6. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, governors for said driving gas generators, a fuel supply control device for each internal combustion engine, in each governor a movable member adapted to actuate said fuel supply control device of the pertaining internal combustion engine and to control the output of the driving gas generator by varying the fuel supply to said internal combustion engine, a device responsive to the speed of said internal combustion engine and adapted to move said member to reduce the fuel supply upon a rise in speed and vice versa upon a reduction in speed, and a device responsive to a pressure prevailing in said driving gas generator adapted to move said member contrary to said speed responsive device upon a rise or a reduction, respectively, in said pressure.

7. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, governors for said driving gas generators, a fuel supply control device for each internal combustion engine, in each governor a movable member adapted to actuate said fuel supply control device of the pertaining internal combustion engine and to control the output of the driving gas generator by varying the fuel supply to said internal combustion engine, a device responsive to the speed of said internal combustion engine and adapted to move said member to reduce the fuel supply upon a rise in speed and vice versa upon a reduction in speed, a device responsive to a pressure prevailing in said driving gas generator adapted to move said member contrary to said speed responsive device upon a rise or a reduction, respectively, in said pressure, and a resistance actuating said member to co-act with said speed responsive device.

8. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more reciprocating engines adapted to be driven by said driving gas mixture, governors for said driving gas generators, a fuel supply control device for each internal combustion engine and in each governor a movable member adapted to actuate said fuel supply control device of the pertaining internal combustion engine and to control the output of the driving gas generator by varying the fuel supply to said internal combustion engine, a device responsive to the speed of said internal combustion engine and adapted to move said member to reduce the fuel supply upon a rise in speed and vice versa upon a reduction in speed, a device responsive to the pressure of said driving gas mixture adapted to move said member in a similar way as said speed responsive device upon a rise or a reduction, respectively, in said pressure, and a resistance actuating said member to counteract said speed responsive and pressure responsive devices.

9. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more turbines adapted to be driven by said driving gas mixture, governors for said driving gas generators, a fuel supply control device for each internal combustion engine, in each governor a movable member adapted to actuate said fuel supply control device of the pertaining internal combustion engine and to control the output of the driving gas generator by varying the fuel supply to said internal combustion engine, a device responsive to the speed of said internal combustion engine and adapted to move said member to reduce the fuel supply upon a rise in speed and vice versa upon a reduction in speed, and a device responsive to the pressure of said driving gas mixture adapted to move said member contrary to said speed responsive device upon a rise or a reduction, respectively, in said pressure.

10. In a plant, the combustion of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, and devices for said driving gas generators, each one of said devices being responsive to the speed of the pertaining generator as well as to a pressure prevailing in said generator and adapted to control the output of the generator by varying the fuel supply to the internal combustion engine comprised therein.

11. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said generators, one or more motors adapted to be driven by said driving gas mixture, devices for said driving gas generators, each one of said devices being responsive to the speed of the pertaining generator as well as to a pressure prevailing in said generator and adapted to control the output of the generator by varying the fuel supply to the internal combustion engine comprised therein, and a second device for each one of said driving gas generators responsive exclusively to the speed of the pertaining generator and adapted to reduce the fuel supply to the pertaining internal combustion engine successively when a certain speed is exceeded.

12. In a plant, the combination of driving gas generators comprising air compressors driven by internal combustion engines and adapted to produce a driving gas mixture containing partly expanded exhaust gases of the internal combustion engines and air of substantially the same pressure compressed by the compressors, a communication between delivery portions of said driving gas generators, one or more motors adapted to be driven by said driving gas mixture, governors for said driving gas generators, and for each governor a device responsive to the speed of the pertaining generator and a device responsive to a condition of the pressure medium, said devices being adapted to simultaneously actuate said governor, which is adapted to control the output of the pertaining driving gas generator by varying the fuel supply to the internal combustion engine comprised therein.

JOHAN ERIK JOHANSSON.